United States Patent Office 3,270,047
Patented August 30, 1966

3,270,047
ORGANOBORON URETHANES
Theodore L. Heying, North Haven, Conn., Joyce Ann Reid, Highland Park, N.J., and Samuel I. Trotz, Orange, Conn., assignors to Olin Mathieson Chemical Corporation, a corporation of Virginia
No Drawing. Filed Dec. 1, 1964, Ser. No. 415,864
2 Claims. (Cl. 260—482)

This invention relates to organoboron urethanes and to a method for their preparation. More particularly, this invention relates to a method in which, in the first stage, an organoboron carboxylic acid halide is reacted with an alkali metal azide to form an organoboron isocyanate which, in the second stage, is reacted with an alcohol to yield an organoboron urethane.

The organoboron carboxylic acid halides useful in the process of this invention have the formula:

$$RR^aB_{10}H_8(CR^bCR^c)$$

wherein R and $R^a$ are selected from the group consisting of hydrogen and alkyl of from 1 to 5 carbon atoms, $R^b$ and $R^c$ are each selected from the group consisting of hydrogen and —COX, wherein X is selected from the group consisting of chlorine, bromine and iodine and with the proviso that at least one of $R^b$ and $R^c$ is —COX. The compounds of Formula A are generally referred to as carborane-type compounds and in the process of this invention ortho-, meta-, or para-carborane can be employed as starting materials. Organoboron carboxylic acid halides can be prepared by the method set forth in Ager et al., U.S. Patent 3,109,026. For example, the compound $$B_{10}H_{10}[C(COCl)]_2$$

can be prepared by refluxing a mixture of $$B_{10}H_{10}[C(COOH)]_2$$

phosphorus pentachloride and carbon tetrachloride for about 7 hours while chlorine is bubbled through the reaction mixture.

Alkali metal azides suitable as starting materials in the process of this invention include sodium potassium, and lithium azides.

Alcohols of the formula:

$$R^dOH$$

wherein $R^d$ is alkyl of from 1 to 10 carbon atoms are useful as starting materials in the method of this invention. Suitable alcohols include methyl alcohol, isopropyl alcohol, n-propyl alcohol, n-hexyl alcohol, isoheptyl alcohol, n-octyl alcohol, n-nonyl alcohol, etc.

The reaction proceeds as set forth in the following equations where, for purposes of illustration, the reaction of $$B_{10}H_{10}[C(COCl)]_2$$

and lithium azide to form the corresponding organoboron isocyanate intermediate which in the second stage is reacted with methyl alcohol to form the organoboron urethane, is shown.

(A) $B_{10}H_{10}[C(NCO)]_2 + 2LiN_3 \xrightarrow[\Delta]{\text{benzene}} B_{10}H_{10}[C(NCO)]_2$ (B) $B_{10}H_{10}[C(NCO)]_2 + 2CH_3OH \longrightarrow B_{10}H_{10}\left[C\left(\begin{smallmatrix}H & O \\ | & \| \\ N-C-OCH_3\end{smallmatrix}\right)\right]_2$ The reactions of this invention are carried out in the presence of an inert organic solvent such as benzene, toluene, xylene, pentane, cyclohexane, methyl cyclopentane, dioxane, ethylacetate, etc. Temperatures of from about 20° C. to about 200° C. can be utilized in the first stage reaction. At the conclusion of this phase of the reaction, the insoluble alkali metal chloride is removed.

In the second stage reaction temperatures ranging from about 0° C. to about 200° C. can be employed. Preferably, the reactions (both stages) are conducted at the reflux temperature of the particular solvent used. The overall reaction time generally will be from about 1 hour to about 40 hours or more depending upon the particular reactants and reaction conditions employed. The urethane product which precipitates from the reaction mixture can be recovered by any suitable method such as by decantation, centrifugation, filtration, etc. The crude urethane product can be recrystallized from solvents such as methyl alcohol acetone, ethyl acetate, etc. to yield the pure urethane material, if desired.

The novel products of this invention can be utilized as fuels in solid propellants. The solid products of this invention when incorporated with suitable oxidizers, such as ammonium perchlorate, potassium perchlorate, sodium perchlorate, ammonium nitrate, etc., yield solid propellants suitable for rocket power plants and other jet propelled devices. Such propellants burn with high-flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as the pyrotechnic-type igniter, and are mechanically strong enough to withstand ordinary handling.

The method of this invention is illustrated in detail in the following examples which are to be considered not limitative:

*Example I*

2.5 g. carborane-1,2-dicarboxylyl dichloride $$(B_{10}H_{10}[C(COCl)]_2)$$

was dissolved in 25 ml. benzene and 1.5 g. lithium azide was added. The mixture was warmed to reflux temperature as nitrogen was evolved. Heating was continued until gas evolution ceased. A total of 438 ml. (S.T.P.) of nitrogen was evolved (theoretical 418 ml.). The amber solution was filtered. The infrared spectrum of this solution showed a strong absorption at 4.45 characteristic of the isocyanate group and its mass spectrum was indicative of the compound $$B_{10}H_{10}[C(NCO)]_2$$

Treatment of a portion of the benzene solution with excess methanol followed by refluxing led to the precipitation of carborane-1,2-bis-(methylurethane), a white solid, of the formula:

$$B_{10}H_{10}\left[C\left(\begin{smallmatrix}H & O \\ | & \| \\ N-C-OCH_3\end{smallmatrix}\right)\right]_2$$

The product, after being recrystallized from methanol, was analyzed for carbon, hydrogen, and boron and the following results were obtained.

Calc'd for $B_{10}H_{18}C_6N_2O_4$: B, 37.2; C, 24.8; H, 6.2.
Found: B, 37.2; C, 24.8; H, 6.4.

*Example II*

A 3.0 g. (.0141 millimole) sample of carborane-1,2-dicarboxylyl-dichloride was dissolved in 20 ml. of benzene, and 1.5 g. (0.023 millimole) of sodium azide in 5 ml. of water was added. The mixture was stirred at ambient temperature for 18 hours after which the benzene layer was separated and dried over anhydrous magnesium sulfate for 30 minutes. The filtered benzene solution along with washings were then refluxed for 25 hours, during which time 370 ml. (75 percent of theoretical amount) of gas was evolved. Six milliliters of anhydrous methanol was added to the cooled benzene solution in the attempt to prepare a urethane derivative. The white precipitate, which formed as the first few drops of methanol were added, dissolved upon the addition of the remainder of the methanol. The urethane product, which has the formula

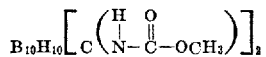

precipitated as a white solid as the mixture was stirred overnight.

*Analysis.*—Calc'd for $B_{10}H_{18}C_6N_2O_4$: B, 37.2; C, 24.8; H, 6.2. Found: B, 36.1; C, 24.8; H, 6.4.

Infrared spectra of the product was in accord with the structure shown above.

The boron-containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron-containing material and from 65 to 90 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethane type, the function of the resin being to give the propellant mechanical strength and at the same time improve its burning characteristics. Thus, in manufacturing a suitable propellant, proper proportions of finely divided oxidizer and finely divided boron-containing material can be admixed with a high-solids content solution of a resin such as that mentioned previously or a prepolymer of the resin, the proportions being such that the amount of resin is about 5 to 10 percent by weight based on the weight of oxidizer and boron compound. The ingredients are thoroughly mixed with the simultaneous removal of solvent, and following this the solvent-free mixture is molded into the desired shape, as by extrusion. Thereafter, the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

What is claimed is:

1. A urethane of the formula:

$$B_{10}H_{10}(CR^hCR^k)$$

wherein $R^h$ and $R^k$ are selected from the group consisting of hydrogen and

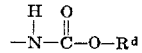

wherein $R^d$ is alkyl of from 1 to 10 carbon atoms and with the proviso that at least one of $R^h$ and $R^k$ is

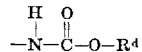

2. 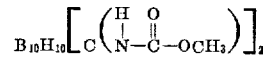

References Cited by the Examiner

UNITED STATES PATENTS

| | | | |
|---|---|---|---|
| 2,945,841 | 7/1960 | Aires | 260—77.5 |
| 3,165,481 | 2/1965 | Brotherton et al. | 260—2 |

LORRAINE A. WEINBERGER, *Primary Examiner.*

CARL D. QUARFORTH, *Examiner.*

L. A. SEBASTIAN, A. P. HALLUIN,
*Assistant Examiners.*